United States Patent [19]
Wick et al.

[11] 3,761,609
[45] Sept. 25, 1973

[54] METHOD AND APPARATUS FOR RECORDING AND REPRODUCING IMAGES ON CONTINUOUSLY MOVING CINEMATOGRAPHIC FILM

[75] Inventors: Richard Wick, Munchen; Friedrich Bestenreiner, Grunwald, both of Germany

[73] Assignee: Agfa-Gevaert AG, Leverkusen, Germany

[22] Filed: Feb. 7, 1972

[21] Appl. No.: 224,162

[30] Foreign Application Priority Data
Feb. 12, 1971 Germany.............. P 21 06 782.3

[52] U.S. Cl. .......... 178/5.4 CD, 178/6.7 A, 352/66
[51] Int. Cl...... G03b 33/14, H04n 5/84, H04n 9/00
[58] Field of Search .................. 178/5.4 CD, 6.7 A; 352/66

[56] References Cited
UNITED STATES PATENTS
| | | | |
|---|---|---|---|
| 2,736,235 | 2/1956 | Toulon................................ | 352/66 |
| 3,510,216 | 5/1970 | Wagman............................. | 352/66 |
| 3,591,268 | 7/1971 | Neale.................................. | 178/6.7 A |

Primary Examiner—Howard W. Britton
Attorney—Michael S. Striker

[57] ABSTRACT

A continuously moving web of motion picture film the rear side of which is provided with a layer of black-and-white photosensitive material and the front side of which is provided with a spherical grating is exposed to light which is projected by a transformation lens whose front focal plane coincides with the plane of a ground glass plate. A lens focusses an intermediate image of a subject or scene onto the ground glass plate and two color components of the intermediate image are modulated by the rasters of a linear grating which is placed immediately in front of or immediately behind the ground glass plate. The exposed layer is thereupon developed and the web is moved at a constant speed in a reproducing apparatus wherein a light source directs light against an aperture which is adjacent to the path of the web. The lenticules of the spherical grating project minute images onto a retransformation lens which focusses a composite of such minute images onto the photocathode of a black-and-white television tube. The photocathode is scanned and the thus obtained information is converted into a color television signal.

10 Claims, 2 Drawing Figures

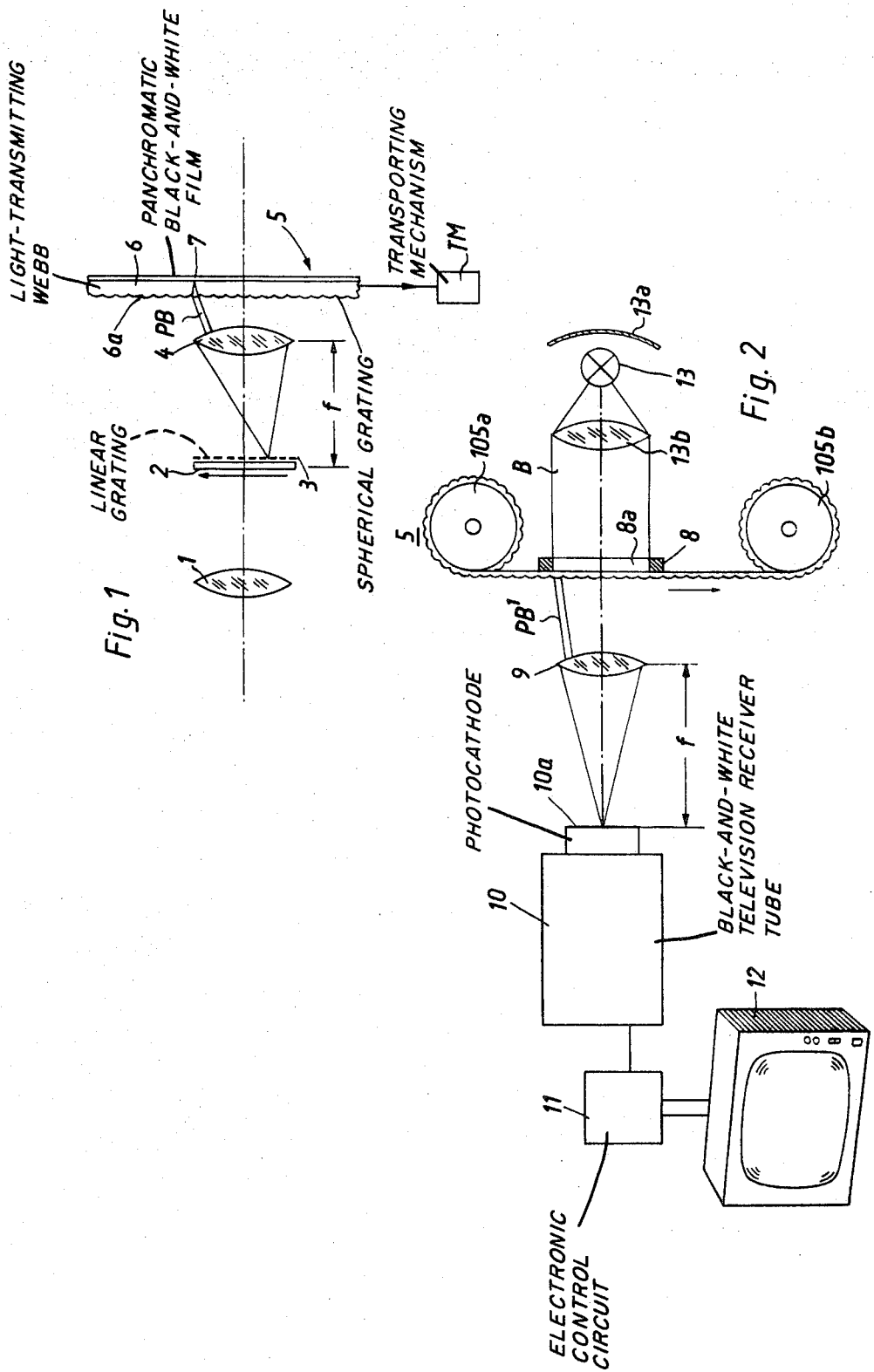

METHOD AND APPARATUS FOR RECORDING AND REPRODUCING IMAGES ON CONTINUOUSLY MOVING CINEMATOGRAPHIC FILM

BACKGROUND OF THE INVENTION

The present invention relates to a method and apparatus for recording color images of a subject or scene on a moving layer of photosensitive material. More particularly, the invention relates to a method and apparatus for recording such images on a continuously moving layer of black-and-white photosensitive material. The invention further relates to a method and apparatus for reproducing the thus recorded images.

A serious problem which is encountered in connection with the recordal and reproduction of information on motion picture film is that the film is normally transported in stepwise fashion. This is due to the fact that the presently known devices for optical compensation of a continuous movement of motion picture film during exposure to scene light are quite complex, expensive and prone to malfunction. Moreover, the quality of reproduced images is unsatisfactory so that such compensating devices failed to gain widespread acceptance and were unable to replace conventional film feeding mechanisms which normally employ a claw pull-down or an analogous film transporting element. A drawback of intermittently operated film feeding mechanisms is that the motion picture film is subjected to considerable wear and tear, especially in the region of perforations for the claw of the pull-down. The wear on the film is even more pronounced if the reproduction of images takes place with high-intensity light and the intervals during which the film is transported between successive dwells are very short.

SUMMARY OF THE INVENTION

An object of the invention is to provide a novel and improved method and apparatus for exposing a continuously moving motion picture film and for reproducing the recorded information while the film is in continuous motion.

Another object of the invention is to provide a novel method and apparatus for exposing a succession of images of a subject or scene on a continuously moving black-and-white film in such a way that the recorded information can be used for the reproduction of color images.

A further object of the invention is to provide a novel apparatus for reproducing the information which is recorded on black-and-white motion picture film while the film is in continuous motion.

An additional object of the invention is to provide a novel record carrier which can be used in the improved recording and reproducing apparatus.

One feature of the invention resides in the provision of a method of recording color images of a subject or scene on photosensitive material which comprises the steps of moving a layer of black-and-white photosensitive material in a predetermined direction along a predetermined path, producing an intermediate image of a subject or scene in a predetermined plane which is spaced apart from and is preferably parallel to the path of the layer, placing a linear grating into immediate proximity of the plane in such position that the color strips of one or more rasters which form the grating extend in parallelism with the direction of movement of the layer whereby the grating modulates at least one color component of the intermediate image, imaging the thus modulated image into infinity, and placing across the infinity image a spherical grating whose lenticules focus minute images of the infinity image onto the moving layer of photosensitive material.

The projection of the modulated image into infinity is effected by a transformation lens whose front focal plane coincides with the plane of the intermediate image and which directs parallel light beams against the lenticules of the spherical grating. The latterr moves with the layer of photosensitive material and is maintained at a fixed distance from such layer. The divergent light beams which reach the transformation lens are converted into the aforementioned parallel beams.

When the layer of photosensitive material is developed and transported at a constant speed (which matches the speed of transport during recordal of images) in a reproducing apparatus, the movements of minute images on the developed layer do not influence the stability of the projected image.

The novel features which are considered as characteristic of the invention are set forth in particular in the appended claims. The improved apparatus itself, however, both as to their construction and mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic view of a portion of a recording apparatus which embodies the invention;

FIG. 2 is a diagrammatic partly perspective view of a reproducing apparatus.

DESCRIPTION OF THE PREFERRED EMBODIMENTS

Referring first to FIG. 1, there is shown an apparatus for recording successive images of a scene or subject on a continuously moving record carrier medium 5. The apparatus comprises a lens 1 which focusses the image of a subject or scene into the plane of and onto a light difusing element here shown as a ground glass plate 2. The latter is in direct contact with a linear grating 3 of known design which can be placed in front of or behind the plate 2. The purpose of the grating 3 is to effect a color encoding of the intermediate image on the plate 2. For example, the grating 3 may comprise two rasters the first of which serves to encode the blue image and the second of which serves to encode the red image. The first raster may comprise a set of parallel yellow filter strips alternating with completely transparent strips of identical width (21 microns). The second raster comprises a set of parallel blue-green strips which alternate with red-transmitting strips of identical width (27 microns). Thus, there develops behind the ground glass plate 2 an image wherein the unfiltered green component is superimposed upon a blue image which is modulated by the first raster and a red image which is modulated by the second raster of the grating 3.

The intermediate image on the plate 2 is located in the focal plane of a condensor 4 which serves as a transformation lens which converts each light beam issuing from the plate 2 into a parallel beam BP. The record medium 5 is located at a variable (but preferably relatively short) distance behind the transformation lens 4 and is arranged to travel at a constant speed (corresponding to the desired image frequency per unit of time) along a path which extends at right angles to the optical axis of the lens 4. The mechanism for transporting the record medium at a constant speed is indicated schematically, as at TM. The strips of the grating 3 are parallel to the direction of transport of the carrier medium 5.

The medium 5 comprises a layer 7 of panchromatic black-and-white film having fine grains and being applied to the rear side of a light-transmitting carrier web 6 of synthetic plastic material. The front side of the carrier web 6 is provided with a spherical grating 6a. The thickness of the carrier web 6 between the grating 6a and the layer 7 is selected in such a way that the focus of each lenticule of the grating 6a is located in the plane of the photosensitive layer 7. The grating 6a can be formed by casting, molding or any other suitable procedure. The lenticules of the grating 6a focus the light beams PB onto the layer 7 to produce on the latter smaller-scale images of the ground glass plate 2. The positions of the minute images which are focussed onto the layer 7 are independent of the distance of lenticules of the grating 6a from the transformation lens 4 so that the record medium 5 can be transported by the mechanism TM at a constant speed. The changes in the discrete smaller-scale images which are focussed onto the layer 7 take place only in response to changes in the subject or scene whose image is focussed onto the ground glass plate 2. The reduction in sharpness of images due to eventual changes in the subject or scene does not exceed that which arises when the pictures are taken by conventional cinematographic apparatus provided that the area whose image is focussed onto the plate 2 does not exceed that of a conventional motion picture image. If the sensitivity of the layer 7 permits it, the reduction in sharpness can be compensated for by reducing the dimensions of the light-admitting aperture, as considered in the direction of transport of the record medium. This influences the reporduction of images which are recorded on the medium 5 only if the dimensions of the light-admitting aperture in the reproducing apparatus match the dimensions of the just discussed aperture in the recording apparatus.

Since the focal length of the lenticules of the grating 6a is very small, the thickness of the carrier web 6 need not exceed the thickness of a conventional film strip. Consequently, the entire record medium 5 (inclusive of the layer 7 and the carrier web 6 with spherical grating 6a thereon) can be readily convoluted in the recording apparatus as well as prior to insertion into and subsequent to removal from the recording apparatus. For example, the record medium can be stored on, collected by and paid out by conventional reels or spools in the same way as commercially available webs of photographic film. When the entire layer 7 of the record medium 5 is exposed, the record medium 5 is transported through a conventional developing apparatus whereby the relationship between the minute images on the layer 7 and the respective lenticules of the grating 6a remains unchanged. Each black-and-white image behind each lenticule of the grating 6a contains three superimposed color images whereby the blue and red images are modulated by the respective rasters of the linear grating 3.

FIG. 2 illustrates a reproducing apparatus for the images on the layer 7 of developed record medium 5 which has been exposed to light in a manner as described in connection with FIG. 1. The transporting mechanism for continuously moving the record medium 5 at a constant speed across a light beam B comprises two spools or reels 105a, 105b one of which is driven to advance the record medium lengthwise in the desired direction and at the speed at which the record medium was transported by the mechanism TM of FIG. 1. The reproducing apparatus includes a source 13 of thermal light which is located in front of a reflector 13a and behind a lens 13b which causes a parallel light beam B to pass through an aperture or window 8a defined by a diaphragm 8.

A retransformation lens 9 is located behind the spherical grating 6a of that portion of the record medium 5 which registers with the aperture 8a, and the distance between the grating 6a and the lens 9 preferably equals that between the grating 6a and the transformation lens 4 of FIG. 1. The focal length f of the lens 9 preferably equals that of the lens 4. The photocathode 10a of a special black-and-white television receiver tube 10 is located in the focal plane of the retransformation lens 9. The tube 10 is connected with an electronic control circuit 11 whose output is connected with a conventional color television receiver 12.

The operation of the reproducing apparatus of FIG. 2 is as follows:

When the light source 13 is on, the beam B passes through the layer 7 of the developed record medium 5 and thereupon through the grating 6a so that the lenticules of the grating 6a produce a series of parallel beams PB' each representing a small image of the respective part of a subject or scene. The lens 9 converts all such images into a single composite image which is focussed onto the photocathode 10a of the black-and-white tube 10. The image which is focussed on the photocathode 10a corresponds essentially to the respective intermediate image on the ground glass plate 2; however, the image on the photocathode 10a is not a color image. The photocathode 10a is scanned by a flying spot, line by line and in a direction at right angles to the direction of strips in the rasters of the linear grating 3, and the thus obtained composite signal contains an unmodulated green component and modulated blue and red components. The control circuit 11 is of known design; its function is to break up the composite signal with high and low passes and to convert the thus obtained signal into a further signal which is transmitted to the receiver 12 as a conventional color signal.

It will be seen that the light source 13 of FIG. 2 directs light against the layer 7 of the record medium 5. Therefore, the spherical waves which issue from the minute images of the layer 7 are collimated by the respective lenticules of the spherical grating 6a, i.e., each such wave is converted into a parallel beam PB'. The image which develops in the lens 9 is focussed onto the photocathode 10a. Due to transformation by a parallel beam, the positions of discrete lenticules of the grating 6a within the area encompassed by the aperture 8a do not influence the positions of images on the photocathode 10a so that the reproduction of images can take place while the record medium 5 is in continuous motion. The sequences appearing on the photocathode 10a are therefore comparable with a continuous transition from a preceding to the next-following stage of movement of the subject or scene. This is due to the fact that, during each interval of time, the area encompassed by the aperture 8a contains partial images of different phases of the recorded event or events. Since such phases follow immediately one after the other, and since the changes of the moving subject are very small, the lack of sharpness which is caused thereby in the reproduction plane is not so pronounced that it would be bothersome to the eye. There is no need to interrupt the beam B during transport of the record medium 5 in the reproduction apparatus in a manner as required in conventional apparatus for reproduction of images on a record medium which was moved stepwise during recordal of images. The plate 2 (as well as the photocathode 10a) always carries a complete image so that no problems arise in connection with synchronization of the transport of record medium with the scanning in the tube 10.

The aforedescribed combination of spherical grating 6a and transformation lens 4 to produce a stationary image during continuous transport of the record carrier in the recording or reproducing apparatus can be used with advantage for the making of black-and-white images without the linear grating 3. However, the grating 3 exhibits the important advantage that color images can be recorded with an outlay which only slightly exceeds the outlay for the recordal and reproduction of black-and-white images. The difference in outlay is particularly small in the recording apparatus but is somewhat more pronounced in the reproducing apparatus (see the control circuit 11 and the color television receiver 12).

In accordance with a recent proposal which is disclosed in our copending application Ser. No. 221,672 filed Jan. 28, 1972, the images of frames on motion picture film are converted into a series of holograms on a web-like carrier, and each such hologram contains encoded color information. The reproduction of images on such carrier (which can be used as a master for the making of duplicates by casting on thermoplastic material) takes place in apparatus which employ a laser serving to furnish a readout beam. Such apparatus further employ a television tube corresponding to the tube 10 and having a photocathode located in the plane of the reconstructed image. The light beam from the hologram to the photocathode is inclined with reference to the readout beam through an angle $\zeta$. If the record medium 5 which has been exposed in the apparatus of FIG. 1 is to be moved through the just described apparatus of our copending application, the readout beam must be superimposed upon the beam between the record medium and the cathode, either by changing the position of the light source or by utilizing a mirror. For example, such superimposition can be achieved with two mirrors which are placed into the path of light.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. A method of recording moving images of a subject or scene on photosensitive material, comprising the steps of moving a layer of photosensitive material in a predetermined direction along a predetermined path at a constant speed; producing an intermediate image of the subject or scene in a predetermined plane which is spaced apart from said path; imaging said intermediate image into infinity to form an infinity image; and placing across said infinity image a spherical grating moving at the speed of said layer and having lenticules which focus minute images of said infinity image onto said layer in said path.

2. A method as defined in claim 1, further comprising the step of placing into immediate proximity of said predetermined plane a linear grating including several sets of colored filter strips having different widths and extending in parallelism with said predetermined direction whereby said grating modulates at least one color component of said intermediate image.

3. A method as defined in claim 1, wherein said images are multi-color images and said layer consists of black-and-white sensitive material, and further comprising the step of placing into immediate proximity of said predetermined plane a linear grating having several sets of color strips which extend in parallelism with said direction whereby said grating modulates at least one color component of said intermediate image.

4. A method as defined in claim 1, further comprising the step of moving said spherical grating with the photosensitive material along said path and maintaining said spherical grating at a fixed distance from said material so that said minute images are focussed onto said layer.

5. A method as defined in claim 4, further comprising the step of convoluting said photosensitive material and said spherical grating upstream and downstream of said path.

6. In an apparatus for recording color images of a subject or scene on a layer of black-and-white photosensitive material, a combination comprising means for focussing an intermediate image of a subject or scene into a predetermined plane; light diffusing means located in said plane; a linear grating immediately adjacent to said plane and including at least one raster having a set of parallel color filter strips extending in a predetermined direction and having a predetermined width to modulate at least one color component of said intermediate image; a transformation lens located behind said plane and having a front focal plane coinciding with said predetermined plane to project said intermediate image into infinity; an elongated carrier including a spherical grating at one side and supporting said grating at the other side thereof, said grating having a plurality of lenticules; and means for transporting said carrier across said projected image in said direction so that said lenticules of said spherical grating focus minute images of said projected image onto the respective portions of said layer.

7. A combination as defined in claim 6, wherein said light diffusing means comprises a ground glass plate.

8. A combination as defined in claim 6, wherein said web consists of synthetic thermoplastic material and said spherical grating forms an integral part of said web.

9. A combination as defined in claim 6, wherein said transporting means includes a device for moving said web at a constant speed.

10. In an apparatus for reproducing the images on a developed layer of black-and-white photosensitive material at one side of a carrier the other side of which is provided with a spherical grating having lenticules which focus onto said layer minute images of a subject or scene during recording while said carrier moves at a predetermined speed, a combination comprising transporting means for moving said carrier at said predetermined speed along a predetermined path; means defining an aperture adjacent to a portion of said path; a light source arranged to direct a beam of light against said aperture so that the beam passes through that portion of said layer which registers with said aperture and thereupon through the respective lenticules whereby said lenticules project minute images recorded on the corresponsing portion of said layer into a predetermined plane; a scanning tube having a photocathode spaced from said plane; and retransformation lens means located in said plane and arranged to focus a composite of said minute images onto said photocathode.

* * * * *